United States Patent [19]

Decker

[11] Patent Number: 4,858,644

[45] Date of Patent: Aug. 22, 1989

[54] FLUID FLOW REGULATOR

[75] Inventor: Kenneth L. Decker, Garland, Tex.

[73] Assignee: Otis Engineering Corporation, Dallas, Tex.

[21] Appl. No.: 200,138

[22] Filed: May 31, 1988

[51] Int. Cl.⁴ ............................................. F16K 15/14
[52] U.S. Cl. .................................... 137/504; 137/517; 251/902
[58] Field of Search .................. 137/517, 504; 251/902

[56] References Cited

U.S. PATENT DOCUMENTS

| 2,189,129 | 2/1940 | Bridwell | 251/902 X |
| 3,319,717 | 5/1967 | Chenoweth | |
| 3,381,708 | 5/1968 | Chenoweth | |
| 3,472,275 | 10/1969 | Castro | |
| 3,741,241 | 6/1973 | Jackson | 137/504 |
| 3,957,083 | 5/1976 | Gallo | 251/902 X |
| 4,746,105 | 5/1988 | Allison | 251/902 X |

FOREIGN PATENT DOCUMENTS

79/00212  4/1979  World Int. Prop. O. .......... 251/902

Primary Examiner—Robert G. Nilson
Attorney, Agent, or Firm—Albert W. Carroll

[57] ABSTRACT

A fluid flow regulator in which the fluid flow therethrough is restricted twice, first through a fixed orifice in a slidable piston and then through a variable flow restrictor which is a spring. This spring is axially aligned with and bears against the piston, and fluids issuing from the orifice empties into the interior of the spring, the end of the spring opposite the piston being closed. Fluids thus flow from within the spring through the gaps between its coils and into a chamber surrounding the spring, and from there exits through the outlet of the regulator. The gaps between the spring coils are quite narrow and cause the flow of fluids to be restricted this second time. This restriction is variable since the piston moves as the differential pressure thereacross varies which causes the length of the spring to vary accordingly. This in turn varies the size of the gaps. In this manner, the regulator compensates automatically to provide a fluid flow rate which is substantially constant.

11 Claims, 4 Drawing Sheets

FLUID FLOW REGULATOR

BACKGROUND OF THE INVENTION

1. Field of the Invention

This invention relates to fluid flow regulators and more particularly to such devices which automatically maintain a substantially constant rate of flow therethrough.

2. Background of the Invention

Flow regulators have been used for maintaining flow of fluids substantially constant despite changes in pressures upstream or downstream of the regulator. Such regulators usually include a spring, and the sole function of the spring is to bias a valve member in a manner to aid in regulating the rate of flow of fluids through the regulator.

U.S. Pat. No. 3,381,703 which issued to D. V. Chenoweth on May 7, 1968 teaches a fluid flow regulator having a spring which biases a sleeve valve toward open position. The sleeve valve carries an orifice plate. Flow through the orifice of the orifice plate creates a drop in pressure and tends to compress the spring and, at the same time, slide the slide valve toward closed position. The reduction in flow diminishes the pressure drop across the orifice plate. The spring reacts by expanding and sliding the valve toward open again. Thus, regulation of the flowing fluid is brought about.

U.S. Pat. No. 3,319,717 issued to D. V. Chenoweth on May 16, 1967 and teaches a system for injecting fluids into a plurality of separate zones in a well through use of a regulator device (like that of U.S. Pat. No. 3,381,708) for each zone.

U.S. Pat. No. 3,472,275 which issued to L. F. Castro et al on Oct. 14, 1969 teaches use of a regulator resembling that disclosed in U.S. Pat. No. 3,381,708 supra. It includes a spring, a valve, and orifice plate which function in about the same manner as do the spring, valve, and orifice plate of the regulator, the spring functioning solely to slide the valve toward open position.

There is not found in the known prior art a flow regulator wherein the flowing fluid passes between the coils of the spring but also through an orifice such that a pressure drop across the orifice compresses the spring, thus forcing its coils closer together, thus pinching and reducing the flow passing therebetween, the thus reduced flow causing a reduction in the pressure drop across the orifice and allowing the spring to expand to permit greater flow between its coils.

The present invention is directed to fluid flow regulators having a housing with a flow course therethrough, a coil spring in the flow course, a piston slidable in the housing and having an orifice therein, the piston having its downstream end abutting the upstream end of said spring, and the downstream end of said spring being closed whereby the stream of fluids flowing through the regulator is first restricted by the fixed orifice in the piston and the flow stream is restricted a second time by a variable restriction in that fluids passing through the fixed orifice lose a portion of their pressure and then are emptied into the coil spring, after which they flow outwardly through the gaps between the coils of the spring, the coils being held close together due to the pressure drop across the fixed orifice causing a displacement of the piston and a resultant compression of the spring which lessens the gaps to restrict the flow a second time to regulate the flow of fluids at a substantially constant rate.

It is therefore one object of this invention to provide an improved fluid flow regulator which regulates flow passing between the coils of a spring by varying the gap between adjacent coils thereof in response to a difference in pressure developed across an orifice in a piston operatively associated with the spring, the spring being compressed as a result of an increased pressure drop across the orifice, thus to force the spring coils closer together to further reduce the flow, and the spring being allowed to expand in response to a decrease in such drop in pressure across the orifice to increase the gap between adjacent spring coils and allow more flow to take place therethrough.

Another object is to provide a regulator wherein the spring is formed with rectangular wire.

Another object is to provide a regulator of the character described wherein the diameter of the piston is approximately equal to the internal diameter of the spring.

Another object is to provide such a regulator in which the piston is provided with a replaceable fixed orifice.

Another object is to Provide such a regulator adapted to be connected directly into a flow conduit.

Another object is to provide such a regulator which is adapted for use in a well flow conduit and/or which is installable in and removable from the well through use of wireline tools, or the like.

Another object is to provide a regulator of the character described in which its flow course terminates in a lateral port and which is adapted for use in side pocket mandrels in wells.

Other objects and advantages will become apparent from reading the description which follows and from studying the accompany drawing, wherein:

DESCRIPTION OF THE PREFERRED EMBODIMENTS

Figures 1, 4:
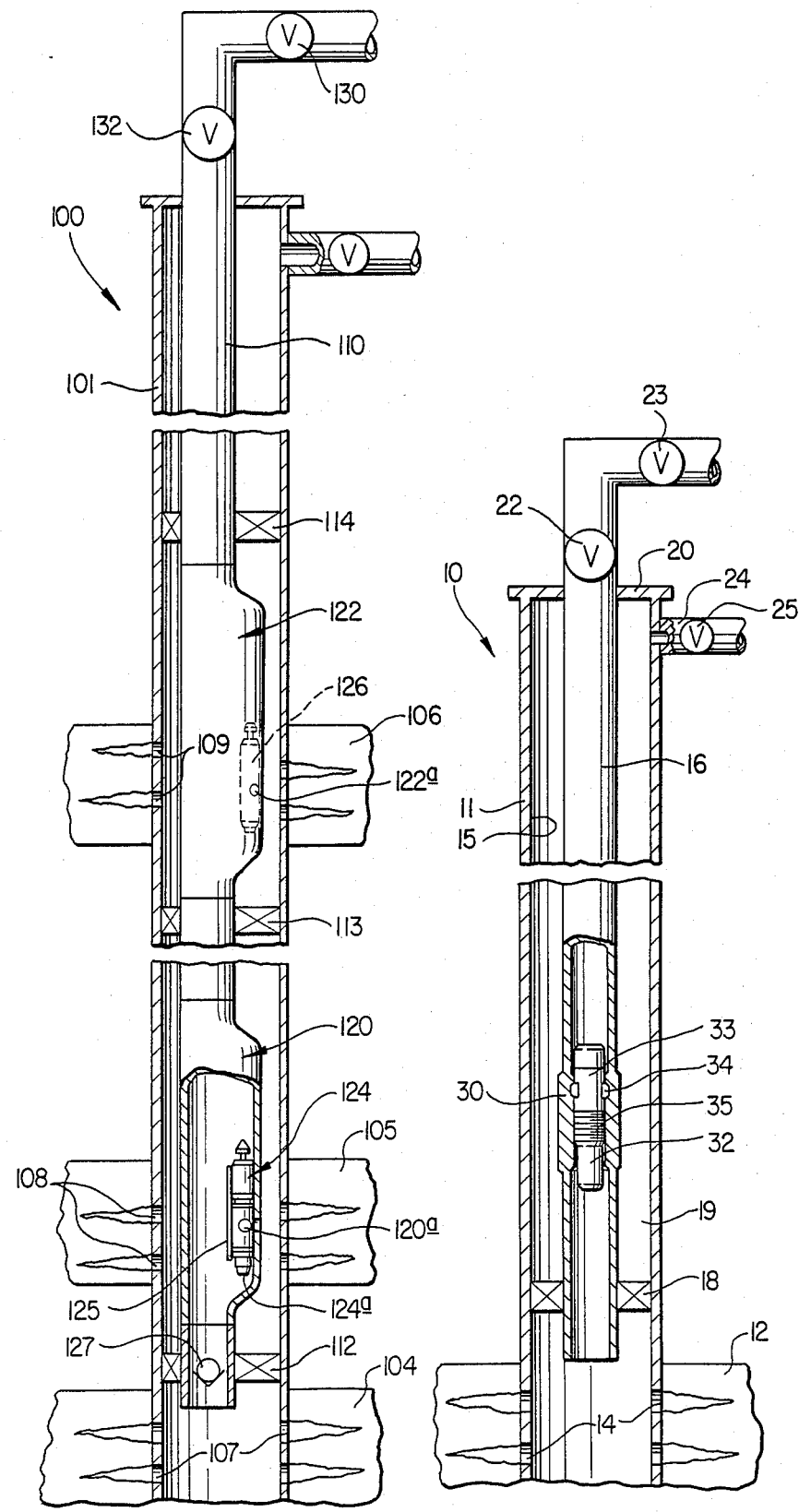
FIG. 1 is a schematical view showing a conventional well with a fluid flow regulator of this invention installed in a landing nipple which forms a part of the well tubing.
FIG. 4 is a schematical view of a multi-zone well having a well tubing therein which includes a plurality of side pocket mandrels, each associated with a separate zone, the side pocket mandrels each having a regulator device of this invention installed in its offset receptacle.

Referring now to FIG. 1, it will be seen that a well 10 has a string of casing 11 which penetrates an earth formation 12 and is perforated opposite the same as at 14 to fluidly communicate the casing bore 15 with the formation 12.

A string of well tubing 16 is disposed in the well casing 11 with its lower open end near the perforations 14 while a packer 18 seals the lower end of the annulus 19 by sealing between the tubing and the casing as shown. The upper end of the annulus 19 is closed by a wellhead 20 and the tubing terminates thereabove with the usual surface connections including master valve 22 and wing valve 23. Near the wellhead 20, the casing 11 is provided with the customary casing wing 24 and wing valve 25, providing access to the annulus 19.

The well tubing 16 in the illustration at hand includes a landing receptacle 30 in which is installed a fluid flow regulator 32 which is anchored by means of a lock device 33 having lock members 34 and seal rings 35 for securing the regulator in the landing receptacle 30 in sealed relation therewith.

Fluids, such as water, for instance, may be injected into earth formation 12 for any desired purpose, such as repressuring the formation, as in waterflood operations where water injected into certain wells drives oil toward production wells through which the oil is forced to the surface for recovery. Such fluids are injected through wing valve 23, master valve 22, down the well tubing 16 and through the flow regulator 32, out the lower end of the tubing and into the open casing therebelow, then outward through the perforations 14 into the surrounding formation 12. The regulator 32 will provide a substantially constant flow rate in a manner soon to be explained.

Figure 2:
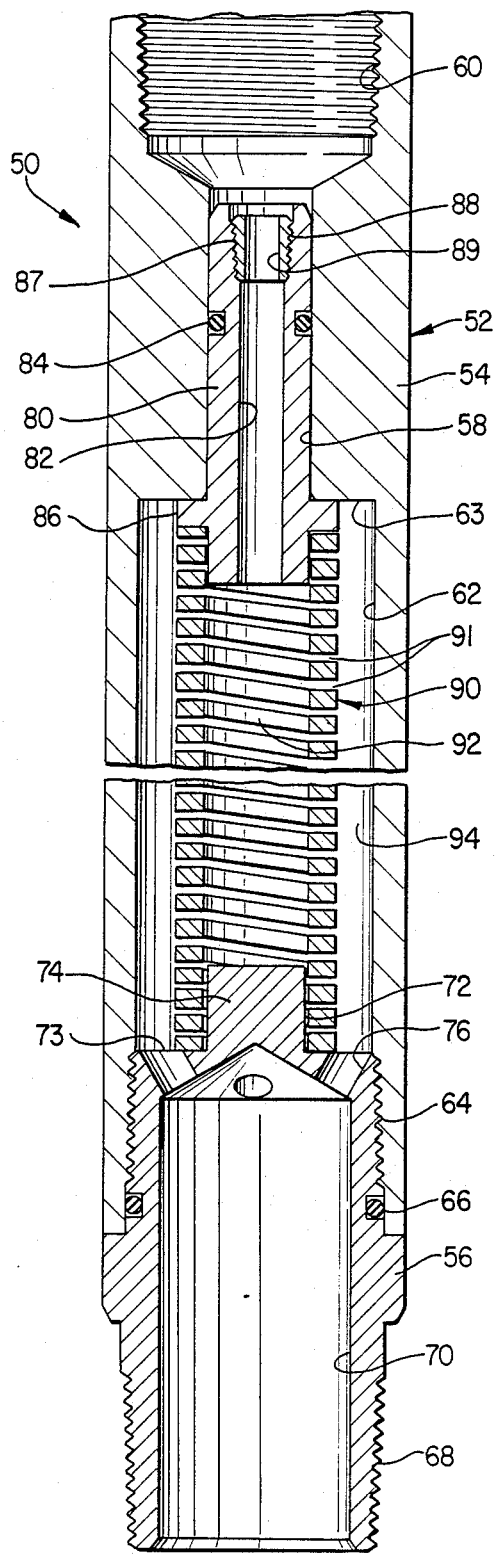
FIG. 2 is a schematical longitudinal sectional view showing one form of the fluid flow regulator of this invention.
Figure 3:
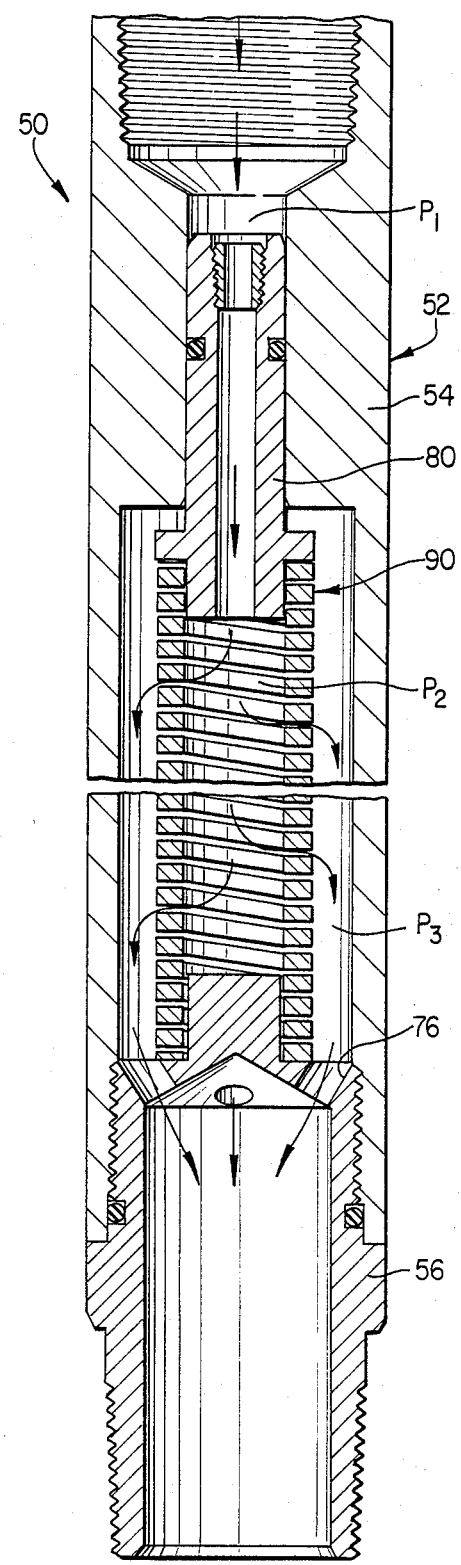
FIG. 3 is a schematical view similar to FIG. 2 showing the device of FIG. 2 as it would appear in operation.

It is seen in FIGS. 2 and 3 that the fluid flow regulator, schematically shown, is indicated generally by the reference numeral 50. This regulator comprises housing means 52 which includes a housing member 54 and a sub 56.

The housing member 54 has a smooth bore 58 which is enlarged and suitably threaded at its upper end as at 60 for attachment to a threaded pipe or a locking device (not shown) by which it may be anchored in a receptacle (such as a landing nipple or the offset receptacle of a side pocket mandrel (not shown). The bore 58 of the housing member is enlarged as at 62 to provide downwardly facing shoulder 63 and is internally threaded as at 64 for attachment of the sub 56. A suitable seal ring, such as o-ring 66 prevents leakage of fluids at thread 64. The lower end of sub 56 is threaded as at 68 for attachment of any suitable item such as additional pipe, a thread protector, or the like.

The sub 56 has a downward opening blind bore 70 which extends almost its full length, terminating near its upper end. Above the upper end of bore 70 the sub 56 is reduced in diameter as at 72 to provide an upwardly facing shoulder 73 and a short upstanding stub 74 as shown. Spaced radially outwardly of this stub is a plurality of circumferentially spaced flow passages or ports 76 which are directed downwardly and inwardly into bore 70 as shown. Thus, bore 62 of the housing member 54 is fluidly communicated with bore 70 of the sub 56 through ports 76 to complete a flow course extending the full length of the regulator housing means 52.

A piston 80, having a flow passage 82 therethrough, has its upper portion slidably received in smooth bore 58 of the housing member 54 and a suitable seal ring such as o-ring 84 seals about the piston to ensure that all fluids flowing through the regulator will pass through piston bore 82.

A short distance above its lower end, the piston 80 is provided with an external flange 86 which serves to limit upward travel of the piston 80 in bore 58 by its engagement with downwardly facing shoulder 63 of the housing member 54.

If desired, the bore 82 of the piston may be made large and have means formed at its upper end for securing therein a flow bean having a suitably sized orifice. While the device 50 is shown provided with a piston having a thread 87 in the upper end of its bore 82 with a screw bean 88, having an orifice 89 therein, securely screwed into place, other securing means could be provided. For instance, the piston bore 82 could be flared at its upper end to receive a tapered flow bean which could be pressed or driven into place, or the bore 82 could be counterbored at its upper end to receive a flow bean which could be held in place with a snap ring. The flow bean in either case is readily replaceable. The flow bean constitutes a fixed orifice in the flow course through the regulator device.

A straight helical spring 90 is disposed within the housing means 52 and has its lower end telescoped over the stub 74 of the sub 56 and has its lower end surface in contact with the upwardly facing shoulder 73 and is supported thereupon. Thus the lower end of the spring is substantially closed, as clearly shown.

The upper end of the spring has its upper end telescoped over the lower end of the piston 80 and bears upwardly against the lower side of external flange 86. Thus, the spring applies an upward bias to the piston tending to force it towards its uppermost position in which its external flange 86 abuts the downwardly facing shoulder 63. Of course, if spring 90 is short or shoulder 63 positioned too high in the housing member 54, the flange 86 may not actually abut shoulder 63 even when the spring is fully expanded. In most cases, however, the spring will have a preload and the piston flange 86 will abut shoulder 63 of the housing when the piston displacement is zero.

It is readily seen that all fluids flowing downwardly through the orifice 89 of piston 80 will exit the same by emptying into the interior 92 of spring 90, and since the upstanding stub 74 of the sub 56 closes the lower end of the spring, the fluids have only one way out and that is to flow outwardly through the gaps 91 between the spring's coils. Thus, the fluids escape into the annulus 94 between the outer surface of the spring and the wall of bore 62. From there the fluids can flow downwardly through ports 76 and into bore 70, then flow out of the lower end of the regulator.

Spring 90 is preferably formed with coils of substantially rectangular shaped wire of a material, or maybe even a wire of trapezoidal cross-section which when wound to form the spring will be transformed to a cross-section which is substantially rectangular. Also the wire should be of a width and thickness which will provide the physical characteristics required. Thus formed, the spring, when closed, takes on the form of a rather perfect cylinder. This occurs only when the piston reaches its maximum travel, that is under a high flow rate. Under such conditions a spring formed of round wire would not form such a perfect cylinder because its coils would tend to distort and misalign. Thus the gaps between the coils could not be controlled by the axial load applied to the spring by the piston.

Preferably the spring is formed of a material which is hard and, therefore, able to resist flow-cutting, and also corrosion resistant. A good choice of material is Inconel X 750, for example.

It is understood that a first drop in fluid pressure will be created across the fixed orifice 89 of piston 80. It is also now readily understandable that a second drop in pressure will be developed as the fluids flow from the spring interior to the annulus 94 exterior thereof and that this pressure drop results from the fact that the narrow gaps 91 between adjacent coils are effective flow restrictors. It should be understood that in the regulator device shown schematically in FIGS. 2 and 3, the gaps may be exaggerated and that in actual practice the gaps may in fact be somewhat narrower than they appear to be in the drawing.

Since the pressure of the flowing fluids is reduced as they pass through the fixed orifice of the piston, this drop in Pressure generates a force which acts upon the piston tending to move it in a downstream direction and compress the spring. Compressing the spring moves its coils closer together and narrows the gap 91 therebetween. When the differential pressure across the piston is reduced, the piston moves upstream, the spring is allowed to expand, and the gaps thereof increase in size. Thus, the spring provides a flow restriction which is variable.

The fluid flow regulator 50 of FIGS. 2 and 3 will thus reduce the pressure of the fluids flowing therethrough at two different places in a manner which will now be explained.

Fluids delivered to the inlet of the regulator arrive at a pressure indicated by the reference P1 at the upstream side of the piston as seen in FIG. 3. These fluids are forced through the passageway 82 of the piston and emerge in the interior of the spring at a pressure of P2. Pressure P2 is somewhat less than pressure P1. Thus, a reduction in pressure is effected by restriction of the flow passage through the piston and this restriction can be varied as desired through use a variety of screw beans, such as screw bean 88, having various sizes of orifices.

Since pressure P2 exists within the spring 90 and the gaps between the adjacent coils may be very narrow, these gaps may restrict the flow of fluids therethrough quite effectively so that they arrive at the annulus 94 exterior of the spring at a pressure P3. Pressure P3 will be considerably less than pressure P2 or essentially equal to formation pressure.

Thus the pressure of the flowing fluids is reduced once because of the energy required to force them through the piston's orifice, and is further reduced a second time because of the energy required to force them through the narrow gaps between the spring coils.

Assuming that the inside diameter of the bore 58 of the housing member 54 is equal to the inside diameter of the spring 90, then it is clear that the pressures P1 and P2 act against equal areas of the piston, pressure P1 tending to force the piston downward and pressure P2 tending to force the piston upward.

Since during the injection operation when fluids are forced downwardly through the regulator device a drop in pressure is created across the piston causing pressure P2 to be somewhat less than pressure P1, a downward force is clearly applied to the piston and if this force is sufficiently great, it will force the piston down and will compress spring 90 and will cause the coils thereof to be positioned closer together. Since the gaps between the spring coils are now more restrictive, the rate of flow is reduced. This reduction in flow rate results in a reduction in the pressure differential across the piston, thus the downward force on the piston is accordingly diminished. The spring 90, then, decompresses and will move the piston up a little. This widens the gaps between the spring coils and allows more flow therethrough. This reduces pressure P2 below the piston and causes an increase in flow through the piston bore 82. In this manner the flow rate of the fluids flowing through the device is regulated.

It should be noted that since pressure P1 acts upon one side of the piston and that pressure P2 acts upon the other side of the piston, pressure P3 cannot act upon the piston. In fact, pressure P3 has no pressure responsive surface upon which to act and, therefore, pressure P3 cannot directly influence movement of the piston or the size of the gaps between the spring coils.

Thus, as the differential pressure across the piston varies, the piston responds to compress or relax the spring 90 to provide a substantially constant rate of flow through the regulator.

It should be understood that the preload of the spring determines the minimum rate above which the device begins to regulate. And or course the Preload of the spring can be controlled by suitable means such as one or more spacers inserted at the end of the spring to increase its compression or load.

Referring now to FIG. 4, it will be seen that a well 100 is provided with a well casing 101 which penetrates several earth formations, three of which are shown and are indicated generally by the reference numerals 104, 105, and 106 and is perforated as at 107, 108 and 109 as shown. A well tubing 110 includes well packers 112, 113, and 114 which seal between the tubing 110 and the casing 101 just above the formations 104, 105, and 106, respectively. These packers Prevent commingling of the formations, thus isolating them one from the other.

The well tubing 110 is provided with a first side pocket mandrel 120 opposite formation 105 and a second side pocket mandrel 122 opposite formation 106. The side pocket mandrel 120 has a fluid flow regulator 124 in its offset receptacle 125 and, likewise, side pocket mandrel 122 has a fluid flow regulator 126 (dotted lines) in its offset receptacle. Fluid flow regulators 124 and 126 may be exactly alike and each constitutes a second form of the present invention which will soon be described.

A standing valve is located near the lower end of the tubing 110 and is indicated by the reference numeral 127. The standing valve permits upward flow only, and will not permit downward flow therepast. Thus, when fluids are pumped into the well tubing through wing valve 130 and master valve 132, such fluids cannot flow past standing valve 127, and thus cannot enter formation 104 therebelow. However, such fluids pumped into the well tubing 110 can be directed into formations 105 and 106. For instance, fluids flowing downwardly through the well tubing and entering side pocket mandrel 120 can enter the lower open end 124a of regulator 124 and exit the lateral outlet port 124b thereof, then pass through the lateral opening 120a of the side pocket mandrel, and through the casing perforations 108 into the earth formation 105 surrounding the well. Similarly, pumped fluids entering side pocket mandrel 122 may pass through regulator 126 and exit the side pocket mandrel through its lateral opening 122a, then flow through casing perforations 109 into formation 106.

Should it be desired to pump fluids into the lowest formation 104, the standing valve 127 can be replaced with a regulator of this invention, such as the regulator of this invention, such as the regulator 32 of FIG. 1 which may be structured like regulator 50 of FIGS. 2 and 3.

Figure 5:
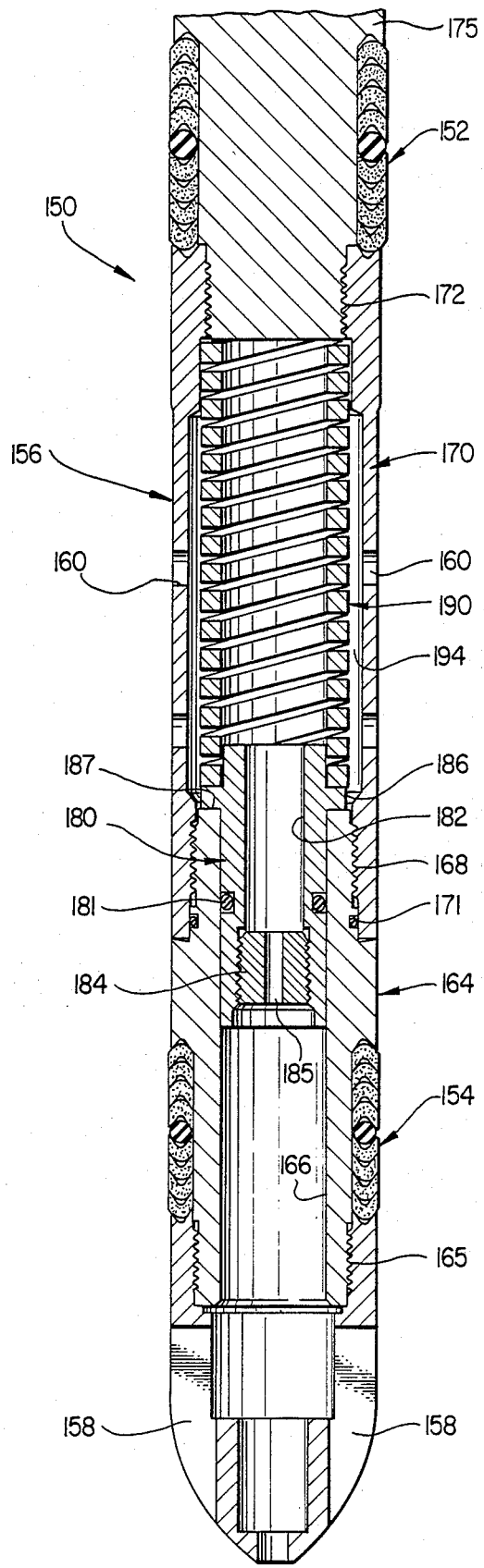
FIG. 5 is a fragmentary view in longitudinal section showing a fluid flow regulator constructed in accordance with the present invention and particularly suited for use in a side pocket mandrel, such as shown in FIG. 4.

In FIG. 5 there is illustrated a fluid flow regulator which is suitable for use in a side pocket mandrel, such as side pocket mandrel 124 or 126 of FIG. 4, or in a bypass type landing nipple (not shown). This regulator representing the second form of this invention is indicated generally by the reference numeral 150.

The fluid flow regulator 150 is for use in a receptacle having a lateral flow opening with a smooth bore both above and below such lateral flow opening. Also, above the smooth bore, a suitable receptacle will have a lock shoulder engageable by a suitable lock device for anchoring the regulator 150 in the receptacle while the upper and lower seal means, such as upper and lower packing sets 152 and 154, which may consist of v-packing arranged as shown, engage the smooth bore of the receptacle above and below the lateral flow opening, respectively, of the receptacle.

The fluid flow regulator 150 is somewhat different from the regulator 50 previously described. The regulator 150 has a housing means 156 which has a flow inlet 158 at its lower end and a flow outlet 160 intermediate its ends as shown.

The housing means includes a lower end cap 162 screwed onto the lower end of a cylinder 164 by means of thread 165. Cylinder 164 is provided with a smooth bore 166. The upper end portion of the cylinder 164 is threaded as at 168 for attachment of housing member 170 and this connection is sealed by a seal ring such as o-ring 171. Housing member 170 is internally threaded at its upper end as at 172 to receive the lower threaded end of upper sub 175 which closes the upper end of the housing member 170 and attaches to a suitable anchor means (not shown) for anchoring the device in a suitable receptacle, such as a side pocket mandrel or a bypass nipple.

Piston 180 is slidably mounted in the housing means 156 and more specifically the lower end portion of the piston is slidable in smooth bore 166 of cylinder 164. A suitable seal ring, such as o-ring 181, seals between the piston and the wall of bore 166. Piston 180 has a bore 182 which may be made oversize as shown and threaded preferably at its lower end to receive a screw bean 184 having an orifice 185 of selected size extending therethrough as shown.

Movement of the piston 180 into the bore 166 of cylinder 164 is limited by flange 186 formed about the piston and which engages the upper end face 187 of the cylinder.

A spring 190 is supported upon the upper side piston flange 186 and its upper end bears against the lower end of upper sub 175, as shown. It is clear that the lower end of upper sub substantially closes the upper end of spring 190. It is also clear that the inside diameter of the housing member 170 is enlarged as at 192 in the vicinity of the spring to provide an annular chamber 194 about the spring to receive fluids flowing outwardly between the spring coils and to conduct such fluids to the outlet ports 160.

The regulator device 150 just described can be attached to a suitable lock device as before explained and can be installed in and removed from a suitable side pocket mandrel, such as the side pocket mandrel 120 or 122 of FIG. 4, through use of conventional wireline tools and a suitable kickover tool, or through use of pumpdown tools and a suitable pumpdown kickover tool. Suitable side pocket mandrels and kickover tools (both of the wireline and pumpdown types are available from Otis Engineering Corporation, Dallas, Tex. 75381-9052.

When installed in a side pocket mandrel, fluids injected into the well, as explained with respect to FIG. 4, enter the inlet openings 158 at the lower end of the regulator device 150, flow upwardly and through the orifice 185 of screw bean 184 and empty into the interior of spring 190. Of course, the fluid pressure drops as it passes through the orifice. Thus, the pressure downstream of the orifice and interior of the spring is somewhat lesser than the pressure upstream of the orifice.

Fluids within the spring 190 then flow outwardly through the restrictive gaps between adjacent coils of the spring (and these gaps are considerably more restrictive than they appear to be in the drawing) and into the annular chamber 194. The fluids are then directed to the outlet ports 160 through which they flow outwardly into an annular chamber (not shown) in the offset receptacle of the side pocket mandrel and subsequently through the lateral flow port of the side pocket mandrel into the tubing-casing annulus, and finally through the casing perforations into the formation surrounding the casing.

It can now be understood that the pressure drop across the piston 180 must be sufficient to at least balance the preload of spring 190 to cause the regulator to begin operating properly. A subsequent increase in upstream pressure, or a decrease in downstream pressure, causes the piston to move in a direction to compress spring 190, thus moving its coils closer together and further restricting the flow outwardly through the spring. This action prevents the higher upstream pressure from increasing the flow rate through the device, and it also decreases the differential pressure across the piston, which allows the spring to expand and move the piston back to its normal position.

The diameter of piston 180, or the inside diameter of cylinder bore 166, is approximately equal to the inside diameter of spring 190. Thus, the piston area subject to upstream pressure is substantially equal to the piston area subjected to pressure inside the spring. In this manner, pressure exterior of the spring, such as pressure in annulus chamber 194, and outlet ports 160 will not affect the piston.

Thus, the regulator device 150, like the regulator device 50, previously described, is capable of regulating the flow of fluids therethrough as a substantially constant rate so long as the rate of flow is at least sufficiently great to generate a drop in pressure across the piston which will create a force thereacross which will at least balance the preload of the spring.

It may happen that although a spring, such as spring 90, has been manufactured within acceptable tolerances, it will not shut off flow through its gaps 91 when it is compressed to its solid height. If, during operation, insufficient pressure drop is created across the spring to effect regulation of the flow rate in spite of the fact that it is compressed solid, it is because the leakage through its gaps is too great to drop the pressure to bring about piston displacement and cause the device to regulate. This can be remedied, as will now be explained.

Figure 6:
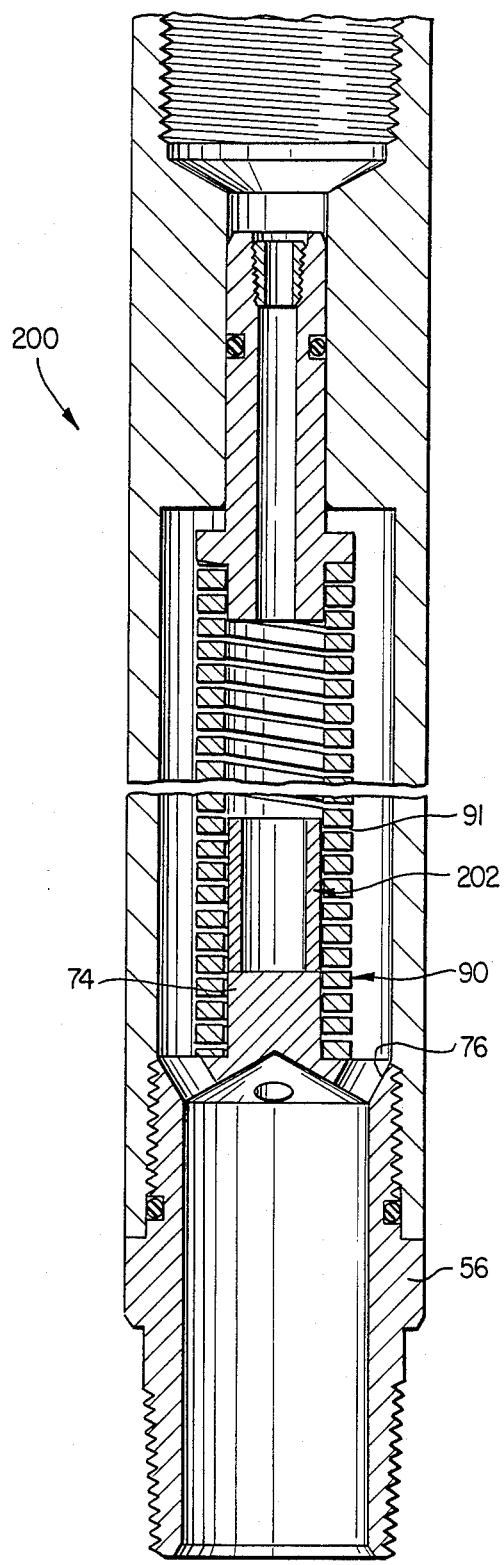
FIG. 6 is a view similar to FIG. 3 showing a tube placed within the spring for compensating for a spring whose gaps do not close off properly when the spring is compressed to solid height.

In FIG. 6 a regulator 200 is illustrated and ma be exactly like the regulator 50 previously described, but has a tube such as tube 202 placed within the spring 90. Tube 202 has its outer diameter sized to barely slide within the spring where it rests upon the upper end of stub 74 (over which the lower end of spring 90 is telescoped).

The tube 202 substantially closes off all gaps 91 below the upper end to tube 202 and forces the outwardly flowing fluids to pass through the gaps 91 above the tube. Since there are now fewer gaps to conduct the fluid, the pressure drop across the spring will be excessive and the pressure inside the spring rises, thus reducing the difference in pressure across the piston. This results in the spring expanding to move the piston against the reduced pressure drop thereacross. Expansion of the spring thus opens up the gaps and the regulator again regulates to maintain a substantially constant flow rate therethrough.

The tube 202 can be made longer or shorter as necessary to bring about the desired result.

If desired, a rod can be used in the place of tube 202. It is readily understood that, if desired, the sub 56 could be formed with a stub 74 of considerable length, and that this long stub could be shortened if necessary.

In addition, the regulator 150 of FIG. 5 could be furnished with means for closing off some of the gaps of its spring in the manner just described with respect to regulator 50.

Further, the sub 56 which forms the lower section of housing 52 of regulator 50 could be formed with bore 70 thereof extending the full length of the sub, in which case the stub 74 and the bypass ports 76 could be provided by a disk engaged between the lower end of the spring 90 and the upper end of the sub 56.

Additionally, if desired, and especially if suitably clean fluids are to be forced through either of the regulators, the seal means on the piston, such as the o-ring, could be replaced by a labyrinth seal, likely comprising a series of external annular grooves.

Thus, it has been shown that the invention described hereinabove and embodied in devices such as the regulator devices 50 and 150, illustrated and described hereinabove, and their mechanical equivalents can be secured in a flow conduit and are capable of regulating the flow therethrough at a substantially constant flow rate within their operating range by automatically compensating for variations in pressures either upstream or downstream thereof. Thus, the devices disclosed hereinabove are able to fulfill all of the objects set forth early in this application.

The foregoing description and drawings of the invention are explanatory and illustrative only, and various changes in sizes, shapes, and arrangement of parts, as well as certain details of the illustrated construction, may be made within the scope of the appended claims without departing from the spirit of the true invention.

I claim:

1. A fluid flow regulator device, comprising:
   (a) housing means having a flow course therethrough;
   (b) a coil spring in said flow course of said housing:
   (c) means in said housing supporting said spring and closing the downstream end thereof;
   (d) a piston slidable in said housing means and closing the upstream end of said spring, said piston having an orifice therethrough and an external flange thereabout for limiting movement of said piston means relative to said housing and relative to said coil spring;
   (e) whereby an increase in the flow rate of fluids flowing through said piston orifice and into said spring will displace said piston and cause it to compress said spring to bring the coils thereof closer together to restrict and reduce the rate of flow to thus allow said piston to move in the opposite direction and allow said spring to relax and its coils to move farther apart so that the flow rate of the flowing fluids will be maintained substantially constant.

2. The device of claim 1, wherein said housing means includes means at one of its ends for attachment to a flow conductor, and means sealing between said piston and said housing means.

3. The device of claim 2, wherein said piston orifice is a replaceable flow bean secured in the flow opening formed in said piston means.

4. The device of claim 3, wherein said spring is wound of a wire which after winding is of substantially rectangular section.

5. The device of claims 1, 2, 3 or 4, wherein said device is for use in a receptacle in a well flow conductor and wherein the downstream end of said flow course through said housing means terminates in lateral port means and said housing means is provided with external seal means above and below said lateral port means, adapting said device for use in a receptacle in a well flow conductor.

6. The device of claim 1, 2, 3, or 4, wherein the diameter of said piston approximates the internal diameter of said spring.

7. The device of claim 1, 2, 3, or 4, wherein a cylindrical member is disposed within said coil spring and substantially closes off a number of said gaps between the coils of said spring to reduce the flow capacity of said device.

8. A fluid flow regulator device, comprising:
   (a) housing means having a flow course therethrough and connecting means thereon for attachment to a flow conductor; and
   (b) flow controlling means in said housing means for reducing the pressure of the flowing fluids in two stages, including:
      (i) a fixed orifice through which all of the flow is directed for reducing the pressure of the fluid from upstream pressure to an intermediate pressure,
      (ii) a variable flow restrictor in the form of a compressible coil spring, the gaps between the coils thereof forming a part of the flow path through which all of the flowing fluids pass for further reducing the pressure from intermediate pressure to substantially final downstream pressure, and
      (iii) piston means including a piston having equal upper and lower pressure responsive areas exposed to fluid pressures immediately above and below said fixed orifice and movable in response to variations in the differential between those pressures for varying the compression of said spring to vary the gaps between the coils thereof to automatically maintain such flow at a substantially constant rate;
   (c) said fixed orifice being located in said piston and extending therethrough; and
   (d) said piston being provided with an external flange for limiting movement thereof relative to said housing and to said spring.

9. The device of claim 8, wherein means is provided for sealing between said piston and said housing means, and said orifice if provided in a flow bean secured in a passage which extends through said piston.

10. The device of claim 9, wherein the downstream end of said flow course through said housing means terminates in lateral port means and said housing means is provided with external seal means above and below said lateral outlet means.

11. The device of claim 8, 9, or 10, wherein a cylindrical member is disposed within said coil spring and substantially closes off some of the gap area to reduce the flow capacity of said device.

* * * * *